United States Patent [19]

Starr et al.

[11] 3,984,995

[45] Oct. 12, 1976

[54] METHOD AND APPARATUS FOR THE TREATMENT OF AIR

[76] Inventors: Robert H. Starr, 938 Concorda Drive, Tempe, Ariz. 85282; Robert L. Starr, 2354 W. Pampa Ave., Mesa, Ariz. 85202

[22] Filed: Mar. 12, 1975

[21] Appl. No.: 557,867

[52] U.S. Cl. ............................. 62/305; 261/140 R
[51] Int. Cl.² ................................... F28D 5/00
[58] Field of Search ............... 62/305, 315; 261/94, 261/99, 103, 106, 26, 140 R

[56] References Cited
UNITED STATES PATENTS

| | | | |
|---|---|---|---|
| 2,259,541 | 10/1941 | Ballard | 62/305 |
| 2,270,810 | 1/1942 | Larriva | 62/305 |
| 3,245,668 | 4/1966 | Goettl | 261/94 |
| 3,427,005 | 2/1969 | Kuykendall | 261/140 R |
| 3,427,005 | 2/1969 | Kuykendall | 62/305 |
| 3,820,353 | 6/1974 | Shiraishi et al. | 62/305 |
| 3,870,485 | 3/1975 | Shiraishi et al. | 62/305 |
| 3,905,203 | 9/1975 | Jacob | 62/315 |

*Primary Examiner*—Lloyd L. King
*Attorney, Agent, or Firm*—Ronald J. Clark

[57] ABSTRACT

An apparatus is described for treating air for use as a coolant for machinery. The treatment includes cooling the air with water without injecting water droplets into the air stream which droplets can visibly be seen to come to rest on the machinery. The principal elements of this water treatment apparatus comprises: low water resistance evaporation means for cooling air passing therethrough; and water dispensing means for uniformly adding water to the water evaporaton means by having water exude from the water dispensing means over an area of mutual contact with the water evaporation means. Improved embodiments employ a temperature sensing mechanism for activating the air treating mechanism dependent upon the temperature of the ambient air. A further embodiment includes a water pressure regulator means for maintaining the required effluence from the water dispensing means to obtain the optimum wetting of the evaporation means.

9 Claims, 6 Drawing Figures

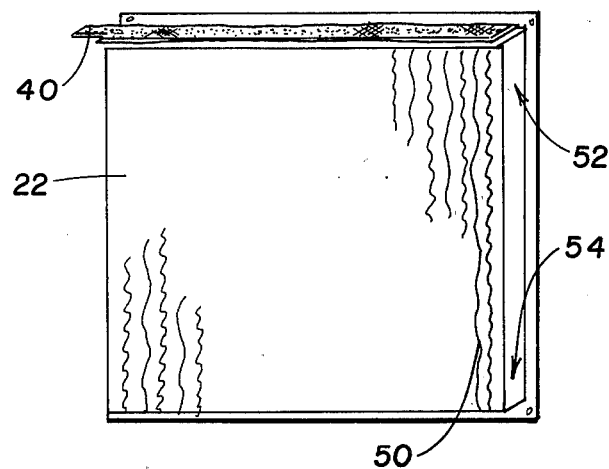
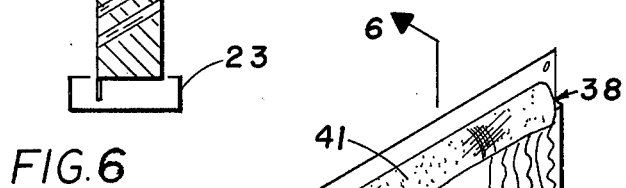
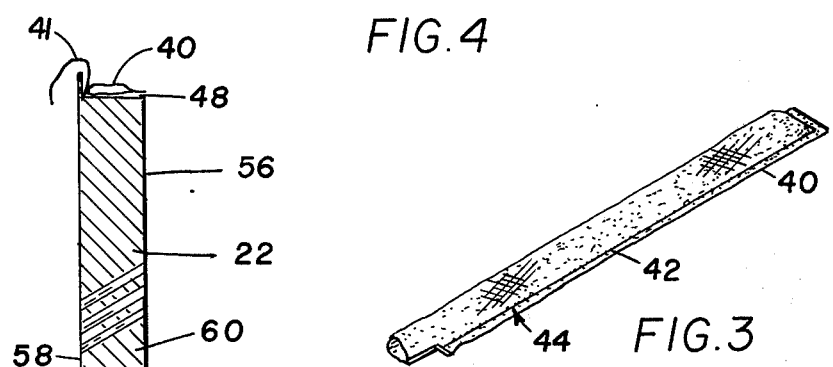
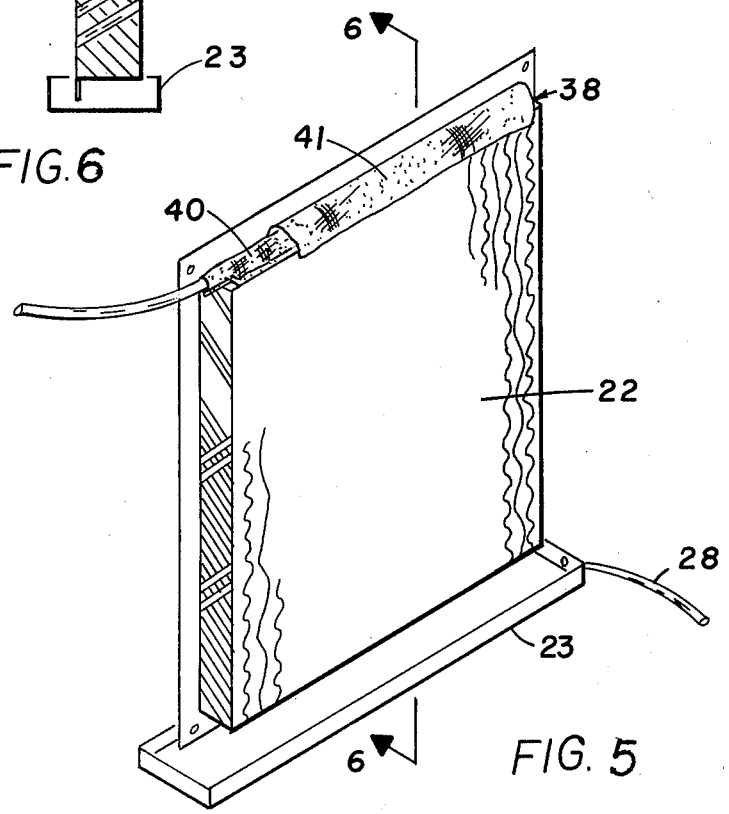

METHOD AND APPARATUS FOR THE TREATMENT OF AIR

BACKGROUND OF THE INVENTION

A home air conditioning unit is well known and many embodiments are available. A typical air conditioning unit contains a heat exchanger or condenser and evaporator. Both of these units include a coil. The coil in the evaporator contains a coolant, such as a freon gas, which has been compressed to lower its temperature. Air from inside the home is passed over the coil and is cooled by the coolant positioned within the coil. The coolant is recycled through the condenser wherein it is recooled through compression. The heat picked up by the coolant when passing through the heat exchanger is then transferred to the ambient air passing over the condensing coils. The present invention is not concerned with the air that is used to cool a house, but rather, the present invention is concerned with the air which is used to cool the operating machinery such as the condenser. A condenser unit exchanges the heat from the coolant to the ambient air passing over the condenser coils. Accordingly, more heat can be transferred by the condenser when the temperature of the ambient air is low. Typically, the temperature of the ambient air varies from climate to climate. The compressor works harder when the ambient air temperature is above that selected as the design temperature at which the condenser is rated. The rating is normally given in tons or BTU'S of a cooling power. Most air conditioners are reated at an ambient of 95° F.

The condenser works more efficiently below the design temperature than above. Typically, in those climates having ambient air temperatures above 95° F, the efficiency of the condenser is reduced in its job of lowering the temperature of the coolant. In this environment, the compressor works longer to provide the required cooling to the coolant. The longer the compressor operates to cool the coolant, the more energy is required to operate the compressor and the more wear and tear the compressor experiences. The additional energy means an added expense to pay for the power. The more wear and tear the compressor experiences, the oftener it must be serviced and/or replaced at more additional expense.

Another term used in identifying the operating condition of a compressor is that of "coolant differential temperature." The "coolant differential temperature" is the difference between the temperature of the desired inside air identified by the thermostat and the temperature of the coolant. Under optimum operating conditions, the "coolant differential temperature" should be within the range of 19° to 21° F. However, through a loss of efficiency, the prior art systems are not able to provide this "coolant differential temperature" and the volume of air to be cooled, i.e., a house, is cooled by a coolant having less than the best "coolant differential temperature," i.e., 14° or 15° F. Under these circumstances a greater "on time" is required to reach the temperature identified by the thermostat.

A special form of the problem of not reaching the required "coolant diferential temperature" occurs when a structure is built with an air conditioning unit which just barely provides the required amount of cooling power at the rated temperature. When the ambient temperature exceeds the rated temperature, the air conditioning unit is not able to deliver coolant with the proper "coolant differential temperature" sufficient to reach that cooling level identified by the thermostat. In this situation the air conditioner runs continuously with a waste of power.

One term used in identifying the operating condition of a compressor is head pressure. The term head pressure indicates how hard the compressor is working in order to compress the coolant material used in the air conditioning system. Just as the air conditioner has an ambient design temperature, i.e., 95° F, at which the air conditioner is rated, the condenser unit has a head pressure rating to indicate its maximum allowable head pressure and its optimum head pressure. Frequently, the optimum head pressure is at a figure which is 25 percent below the maximum rating. For a typical two ton air conditioner, the maximum head pressure is typically identified as 400 pounds, while the optimum rating is typically identified as 300 pounds. When the compressor is operating at 400 pounds, its cooling capacity can be reduced by as much as 50% over its rated cooling capacity at 300 pounds. More specifically, this means that the efficiency of a two ton air conditioner rated at 95° F with an optimum head pressure of 300 pounds when operated at a temperature above its rated temperature, i.e., 110° F, with a head pressure of 400 to 425 pounds, is frequently reduced by 50% and hence operates as a one ton unit. Obviously, a one ton unit will have to work at least twice as long to provide the required cooling of a two ton unit. This added time causes an increase in the cycle time of the air conditioning unit.

The cycle time of an air conditioning unit is divided between its "on time" and its "off time." A two ton unit operating at its rated temperature has an "on time" during which it is used to cool the air inside a house to a desired level selected by the home owner and an "off time" during which the air conditioner is off and not operating. The "on time" of an air conditioning unit is principally a function of the air temperature identified by the thermostat, the insulation of the house itself which determines how fast the cool air leaks out of the house to be replaced by the ambient air temperature, and the efficiency of the compressor. The efficiency of the compressor is best maximized by its operation at an ambient air temperature at or below its rated temperature. The establishment of the improved ambient temperature has the following main advantages: first the "on time" is reduced because the coolant is cooled to its "coolant differential temperature" quicker and with less power; second, the "off time" is extended because of the reduction of "on time" thus reducing the wear and tear on the machinery.

Aluminum is a common material used throughout the condenser unit. The coils are often times made of aluminum as well as other parts of the air conditioning system. In prior art, air treatment systems using water, a problem which occurs in these systems is the injection of water droplets into the air stream. The water droplets are carried to the condenser unit where a particular problem occurs. when the water droplets deposit upon the cooling coils, the water acts as an insulator between the consenser surface covered by the water and the air passing over the condenser coil. The area covered by the water does not participate in the cooling operation and the cooling efficiency of the condenser is further reduced.

Certain of the prior art air conditioning systems, which used a precooler for the condenser unit, often times employed an evaporative member which actually was an obstruction to the flow of air through the evaporative member prior to its passing over the condenser coils. Such an obstruction required additional energy to pull the required amount of air over the condenser coils. Typically, a fan is used to cause air to flow through a prior art evaporative member and then over the condenser coils. Hence, additional fan power is required because of the obstructionistic effect of the prior art evaporative member.

In an aggravated situation, i.e., wherein the obstructionistic effect was pronounced, the air passed over the condenser coils in a shadow-like effect of the fan. The shadow was approximately equal to the area of revolution of the fan blades. Typically, the area of the condenser coil is larger than the area of revolution of the fan. In such a situation, the air would only pass over the condenser coils in a shadow image of the fan. This resulted in a portion of the condenser coils being outside of the shadow effect. This area outside of the shadow effect did not contribute to the cooling efforts of the condenser. This also reduced the efficiency of the condenser.

SUMMARY OF THE INVENTION

The present invention relates to the treatment of air, and more particularly, it relates to the treatment of air using water for reducing the temperature of the air without adding individual water droplets to the treated air.

An object of the present invention is to provide an apparatus for the treatment of air which employs a water dispensing means for delivering a uniform amount of effluent at the point of mutual contact of the water dispensing means with an evaporator means.

A further object of the present invention is to provide a collapsible and expandable member as part of the water dispensing means, which member exudes the effluent from a porous type of tubular material which is expandable under water pressure.

A still further object of the present invention is to provide a water treatment apparatus which provides a minimal resistance to the flow of air through the apparatus as the air is being cooled.

Another object of the present invention is to provide a water cooling apparatus which provides a minimum resistance to the flow of air through the apparatus, and the apparatus receives a quantity of water for thoroughly wetting the evaporator means without creating water droplets which droplets can be picked up by the flow of air and carried beyond the apparatus itself.

A still further object of the present invention is to provide an apparatus for the treatment of air by water which delivers a quantity of cool air to the air using machinery as required.

Another object of the present invention is to provide an evaporator means having a first means for delivering water over a plurality of surfaces extending from the top to the bottom of the evaporator means, a first channel means oriented in the direction of air flow having a first substantially higher resistance to the air flow and a second channel means positioned in the direction of air flow having a second relatively lower resistance to the flow of air.

A still further object of the present invention is to provide evaporator means which is constructed to prevent the passage of water from the front region to the back region, yet which is constructed first to provide a broad frontal area which is continually wet by water, and second, to provide a back surface which is substantially dry.

Another object of the present invention is to provide a mechanism for the treatment of air which provides a large area over which water continuously flows for providing an evaporative cooling action upon the air as it passes over the evaporative surface, and which provides a front region which is continuously wet by water for providing an evaporative action and a rear surface which is substantially dry for removing water droplets from the air stream.

A still further object of the present invention is to provide evaporator means having a water source mounted on its upper surface from which a volume of water exudes over the evaporative surfaces of the evaporator means.

A further object of the present invention is to provide an evaporator mechanism having an evaporative surface over which the water flows and which is shaped so as to provide a maximum resistance to water flow from the front to the back of the evaporator, yet a minimum resistance to the water flow from the top to the bottom of the evaporator.

A still further object of the present invention is to provide evaporator means having a maximized thickness for providing maximum temperature drop between the front and back of the evaporator means due to the evaporative effect of the water.

Another object of the present invention is to provide evaporator means with water dispensing means positioned on the top of th evaporator means to provide a uniform flow of water from the top to the bottom of the evaporator means, yet prevents water droplets and/or spray from entering the air stream as the air passes from the front to the back of the evaporator means.

These and other objects, features, characteristics, and advantages will be apparent by consideration of the following description of a preferred embodiment of the invention, as illustrated by the accompanying drawings.

BRIEF DESCRIPTION OF THE DRAWINGS

FIG. 3 shows the soaker sack used in the system shown in FIG. 2.

FIG. 4 shows an isometric view of the soaker sack, shown in FIG. 3, positioned atop the evaporator means used in the system shown in FIG. 2.

FIG. 5 shows a second isometric view of the soaker sack, positioned atop the evaporator means in combination with a water deflecting flap.

FIG. 6 is a cross-sectional view taken along the line 6—6 shown in FIG. 5.

ADVANTAGES OF THE INVENTION

Figure 1:
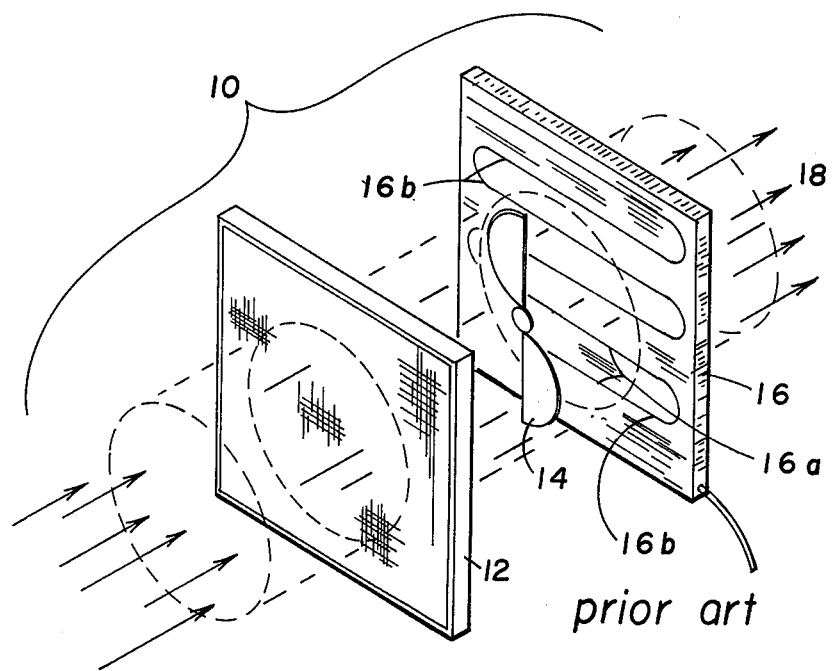
FIG. 1 shows the prior art use of an evaporator pad which restricted the flow of air over the condenser coils.

The present invention is specifically intended to treat air which is being delivered for further use by machinery. More specifically, the particular machinery in the preferred embodiment is a compressor unit for an air conditioning system. In operation, this compressor unit has an operating characteristic which is identified as head pressure. The use of the present invention with such a compressor, at a temperature of 115° F, typically lowers the head pressure of the compressor by 25%. Typically, this results in the head pressure being lowered from 400 pounds to 300 pounds.

While precoolers have been used in the prior art in combination with air conditioning units, these precoolers, have provided a resistance to the flow of air so that energy is required to pass the necessary quantity of air through the precooling element. This is not the case of the present invention as the evaporator material used in the present invention is well known as providing negligible resistance to the flow of air. More specifically, the present invention reduces the air resistance from more than 50% to less than 10%. It is possible to reduce the effective resistance to air flow to zero by enlarging by 10% the surface area through which the air is passing. This increase in area provides a comparable increase in volume of air and the greater volume counter-balances the resistance to the flow of air.

A further advantage in the use of the present invention flows from providing an air stream having a substantially constant temperature to the machinery in question. It has been found that the apparatus of the present invention has consistently cooled air from a temperature in excess of 115° F to the design limit of 85° F ± 2°. Additionally, the apparatus of the present invention is only activated when the ambient temperature is above a predetermined ambient temperature of 85° F.

BRIEF DESCRIPTION OF THE INVENTION

The evaporator means employed in the present invention has a plurality of inner surfaces which perform a dual function. These surfaces carry water and define channels for passing air. The evaporator means has first channels flowing upwardly from the front to the back of the evaporator body. The evaporator means has second channels flowing downwardly from the front to the rear surface of the evaporator. Both the first and the second channels have an intercommunicating surface over which water flows from the top to the bottom of the evaporator. A water dispensing means exudes a flow of water directly on to the surfaces of both the first and second channels by direct contact between the water dispensing means and the channel surfaces. In this manner no spray enters the air flow and, hence, the air flow does not convey water droplets from the front to the back of the evaporator. This design of the evaporator provides maximum area upon which water may evaporate and reduce the temperature of the air passing thereover. The direction of the channels prevents water from passing from the front of the unit to the exit surface of the unit prior to the complete evaporation of the water. The water dispensing means provides just enough water to assure its complete evaporation by the air passing through the evaporator means prior to the air leaving the evaporator. To achieve this function, the evaporator means is preferably 3 inches thick. The flow of water through the evaporator is such that only 25% of the water entering the evaporator at the top exits from the bottom. No water exits from the rear of the evaporator based on the water flow selected. Since the water flow from the front to the back of the evaporator is impeded due to the shape of the first and second channels, the water will evaporate prior to its leaving the rear surface of the evaporator. However, water flows over the entire front surface of the evaporator and a percentage exits the evaporator at the bottom. This water exiting the bottom of the evaporator carries with it the dirt and debris collected from the air as the air passes over the interior evaporator surfaces. This keeps dirt and debris from the machinery which is to be cooled by the air flowing through the evaporator. More importantly, this excess water flow cleanses the interior surfaces of the evaporator means.

The preferred form of the water dispensing means is a canvas bag which is in direct contact with the upper surface of the evaporator means. This contact between the water dispensing means and the evaporating surface assures water flow from the water dispensing means over the entire surface area of the evaporator without ejecting water spray or droplets into the air flow. A cloth flap is positioned over the soaker sack and functions as a water deflecting means for preventing any upwardly directed spray from entering the air stream and falling on to the machinery positioned on the other side of the evaporator. The soaker sack or water dispensing means is positioned at a predetermined location on the upper surface of the evaporator member for insuring that the water dispensed from this water dispensing means flows continually over the front surface of the evaporator yet does not wet the rear surface. This position is one-half inch from the back surface of the evaporator and 1-½ inches from the front surface of the evaporator. Experiments show that the soaker sack should be one inch wide and the thickness of the evaporator should be three inches thick.

Water from the water dispensing means is adjusted according to the size of the evaporated evaporative surface. This adjustment is such as to provide a water exhaust at the bottom of the evaporator sufficient to carry debris and/or dirt from the air out of the evaporator and yet not so high at a water flow rate as to wet the rear surface of the evaporator.

VARIATIONS OF THE INVENTION

A temperature sensing means is provided to activate the water dispensing means when the outside temperature rises above a predetermined level. In the preferred embodiment, this temperature sensing means is set to operate at 85°.

The water dispensing means continues to provide a water flow on to the evaporator after the condenser has turned off. This pre-wets the evaporator so as to avoid any loss of cooling time between the turning on of the evaporator and the time that the water dispensing means provides water flowing over the entire front surface of the evaporator. In this mode of operation, the evaporator is precharged so as to provide maximum cooling in a minimum amount of time once it is again operated. The water dispensing means provides a 100% wetting action over the evaporator surface by being positioned at a predetermined location. The water dispensing means is made of a canvas fabric so as to avoid the use of a member having holes which can be plugged by the deposits of impurities from the water.

The water provides maximum efficiency when the area of the evaporator matches the area of the condenser for modern units. However, in working with older air conditioning mechanisms, it is desirable to provide a smaller area of the evaporator as compared with the area of the condenser. This provides a venturi effect of the air flowing through the evaporator on to the coils of the condenser and provides a more efficient evaporative effect for the units.

DETAILED DESCRIPTION OF THE INVENTION

Referring to FIG. 1 there is shown a prior art system generally employing a water moistened precooler which is made from a material which effectively obstructs the flow of air through the precooler member itself. The system 10 comprises a precooler pad 12, a fan 14 and a condenser coil 16. Portions 16a of the condenser coil 16 are positioned within a column of air indicated by the line 18. Other portions 16b of the condenser coil are positioned outside the column of air 18.

The fan 14 is normally placed in such a way as to draw air through the precooler pad 12 and across the condenser coil 16 of the condenser. As is shown, it is normal that the size of the condenser coils 16 form a frontal area which is substantially larger than the frontal area of the fan 14. Normally, when an obstruction is not present in the flow of air, a cone of air larger than the diameter of the fan 14 is easily moved across the total area of the condenser coils 16. However, when an obstruction, which restricts the flow of air is placed intermediate the condenser coils 16, a shadow effect occurs. This shadow effect means that air moving through the precooler pad 12 is substantially the size of the area of rotation of the fan 14. Since the area of rotation of the fan is smaller than the area of the condenser coils 16, all portions of the condenser coils 16 are not in contact with the flow of air. This reduces the efficiency of the condenser unit by that percentage of the condenser coils not within the air stream. As shown in the figure portions 16a are cooled by the flow of air but other portions 16b are not cooled.

Figure 2:
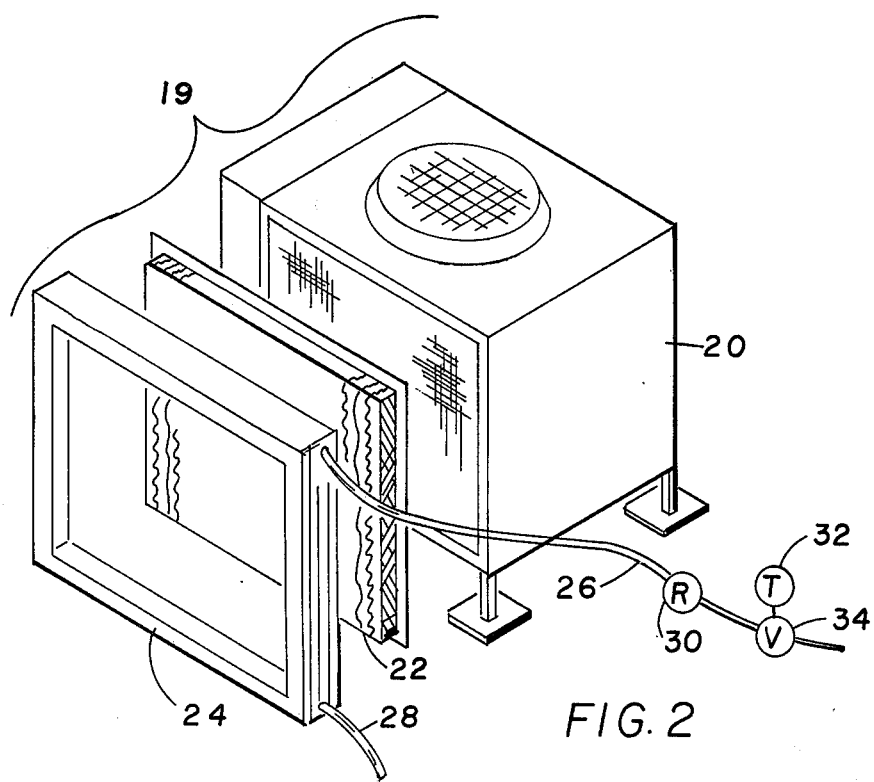
FIG. 2 shows an isometric view of the overall system of the present invention.

Referring to FIG. 2 there can be seen a system's view 19 of the present invention. An air conditioning unit is shown at 20 having a precooler unit 22 made according to the teaching of the instant invention and a protective covering 24 employed to hold the precooler 22 in position with relationship with the air conditioner unit 20. A water intake line is shown at 26 and a water exhaust line is shown at 28. A pressure regulator is shown at 30 for establishing a predetermined water pressure within the intake line. In the preferred embodiment the water pressure is set at 25 pounds per square inch as regulated by a suitable regulator identified as a Watts Water Regulator type 1610 made by the Watts Regulation Company of Lawrence, Massachusetts.

A temperature sensing device is shown at 32 to activate a water valve 34 which turns on the system only above a set temperature. In the preferred embodiment, the preferred temperature is 85° F as selected by a thermostat made by the Franklin Dales Co. of Akron, Ohio.

A suitable valve 34 is identified as a 24 volt solenoid valve model U.S. Pat. No. 826,075 with a one-eighth inch fitting made by the Automatic Switch Co. of Florham Park, New Jersey.

Referring to FIGS. 3 through 6, there can be seen a schematic view of a water dispensing means 38 employed in the present invention. The water dispensing means comprises a tubular member 40 and a water deflecting means 41. The tubular member 40 is made of porous material which is expandable under water pressure. The preferred material is a canvas cotton material and it is sewed with cottom thread 42 along the bottom and one edge as shown at 44. The water dispensing means also includes a water deflecting member 41, best seen in FIGS. 5 and 6, which is disposed over the upper surface of the tubular member 40. In the preferred embodiment, the deflection means is also made of a strip of cotton material. The function of the water dispensing means is to provide a continuous effluent from an exuding surface. This effluent exudes from the porous material, i.e., through the pores and runs from the tubular member 40. At a point in mutual contact with the evaporator means, indicated at 48 in FIG. 6, the effluent runs continuously and in a uniform manner over the vertical surface means of the evaporator 22 for conveying water from the top to the bottom of the evaporator 22. A tray 23 catches any excess which is drained through the exhaust line 28.

One of the requirements of the water dispensing means of the present invention is to provide its water as an effluent. This means that individual spray droplets cannot be injected into the air stream.

In early models of the present invention, minute holes were found in the porous material and under the value of water pressure used herein, these holds passed a stream of water in random directions. The stream of water could enter the air flow and be carried to the coils of the condenser and deposited upon the condenser coils. This water positioned on the condenser coils acted as an insulating member between the coil and the air stream. This insulation effect reduced the efficiency of the condenser coils. Accordingly, effort was necessary to devise a system which eliminated such tiny streams of water. The most common point at which streams of water exited the tubular member 40 was at the stitches 42 holding the canvas material together. When a plastic thread was used which did not expand in contact with water, a stream of water was practically guaranteed to come from each of the stitch holes. Accordingly, a cotton thread was used which expanded in contact with water and effectively filled the hole as a plug when the unit was wet. Accordingly, the water dispensing means of the preferred embodiment employed a porous canvas tubular member using cotton stitching along the bottom and one edge to form a tubular member. To insure that water does not escape from the upper side of the tubular member, a deflection flap 41 is positioned on top of member 40 to deflect downward any streams of water which possibly might escape from the tubular member 40. An equivalent member to the tubular member shown is one made as one piece similar to a sock and having no stitches. Obviously, one end of the sock, such as the open end, is attached to the water supply means while the remaining part of the sock is positioned along the top of the evaporator means.

The water dispensing means 38 shown is expandable and collapsible upon the application and removal of the water pressure. The collapsible feature of the water dispending means 38 is helpful in continuing the water dispensing function over the evaporator means 22 after the water pressure has been removed. More specifically, upon removal of the water pressure, the rate at which the effluent leaves the tubular member decreases. Yet it continues until the entire supply of water within the tubular member 40 is exuded at a rate determined by the porosity of the material and the decreasing pressure from the water itself. This effects a continuing water flow over the evaporator even after the water pressure has been removed.

Obviously, the water pressure need never be turned off, however, this would waste that water flowing down the evaporator means 22 when the unit was not working. Since the water stored within the tubular member 40 continues to wet the evaporator during the "off time" of the unit until the water is expended, the surfaces of the evaporator means 22 are that much wetter as determined by the volume of water contained within the tubular member after the pressure has been removed.

Referring to FIG. 5, the water dispensing means includes a pressure regulator which determines the water pressure applied to the tubular member 40. It has been found through experiments that a water pressure of 25 pounds per square inch is preferred for a tubular member 40 which is 27 inches long and approximately one inch in diameter when expanded. Such a member exudes approximately 4 gallons per hour onto the evaporator means 22. The water exuded in this fashion is evaporated at the rate of 3 gallons per hour leaving a waste of 1 gallon per hour. This rate of evaporation occurs by the mechanism of the air moving through the evaporator means 22 under pressure of the fan (not shown) positioned in the air conditioner 20. The evaporator means 22 can operate efficiently with a total water flow on to the evaporator means 22 which lies within the range of 2 gallons per hour to 6 gallons per hour. It has been found through experiments that the lower flow of water begins to reduce the efficiency of the unit, while the higher flow of water only provides additional run off which is wasted. While the flow of water can be adjusted to a point where actually no water is discharged, it has been found that this is not the best embodiment. The water contains a certain amount of debris including salts which build up on the evaporative surface if a certain amount of run off is not provided to cleanse these debris from the evaporative surface. Accordingly, the preferred embodiment uses a total flow at the rate of 4 gallons per hour which gives a run off at the rate of 1 gallon per hour.

Referring to FIGS. 4 and 5, there can be seen the evaporator means 22 which utilizes a piece of Celdek material which is a registered trademark of the Munters Corporation. The preferred embodiment employs a piece of Celdek material which is approximately 30 inches wide and 23 inches high and 3 inches thick. It has been found that the 3 inch thick piece provides the best embodiment in combination with a water dispensing means 38 operating at 25 pounds pressure with a delivery of water at the rate of 4 gallons per hour to the top of the evaporator means 22. The evaporator means 22 has a first vertically disposed member 50 shown in FIG. 4 extending from the top 52 to bottom 54 of the evaporator means 22. The first vertical member 50 delivers water to a first channel means 60 which extends from the front 56 to the back 58 of the evaporator means 22. A first channel means is shown in FIG. 6 at 60 and is inclined at a relatively greater angle than the angle of a second channel means 62 running downwardly from the front 56 to the back 58. The first and second channel means 60 and 62 have relatively no difference to the resistance to the flow of air from front to back but have a much greater resistance to the flow of water along the surface forming these channels. Accordingly, a greater amount of water is delivered to the first channel means 60 and the first channel means has a greater resistance to water flowing from the front to the back. A smaller degree of water is delivered to the second channel means 62. Through experimentation, it has been found that the combination of the 3 inch thick piece of Celdek material measured front to back, in combination with the water dispensing means exuding an effluent of 4 gallons per hour to the top of the evaporator means will prevent any water droplets from entering the air stream beyond the back surface of the evaporator means.

While the Celdek material has been found to operate satisfactorily within the environment of the present invention, other materials having the same characteristics as described can be substituted therefor.

Referring to FIG. 2, it can be seen that the evaporator means 22 of the present invention is made slightly larger than the intake part of the condenser with which it is designed to operate. Since the evaporator means 22 does not provide a significant obstruction to the flow of air to the air stream, the fan moves a cone of air significantly larger than its area of rotation and, hence, sufficient air can be delivered to all areas of the condenser coils. The resistance to the air flow can be effectively eliminated by making the evaporator member overly large in comparison to the initial entry port of the condenser unit. In this manner an equal amount of air can be delivered to the condenser unit through the evaporator means of the present invention because of its low resistance to the flow of air.

What is claimed is:
1. An apparatus for the treatment of a stream of air passing through the apparatus comprising:
   effluent dispensing means for providing an effluent exuding at a controlled rate from said effluent dispensing means;
   evaporator means having top, bottom, front and back surfaces, said evaporator means being positioned to pass the air stream through said evaporator means from said front surface and exiting from said back surface, and said evaporator mean being positioned in contact with said effluent dispensing means to receive said effluent as it exudes from said dispensing means for preventing water droplets from entering the air stream as the air stream passes through the evaporator means to be cooled; and
   said exuding rate of said effluent being set to a predetermined volume and the air stream moves said effluent along interior surfaces of said evaporator means in the direction of air flow and said effluent which moves in the direction of air flow is evaporated prior to reaching the back surface of the evaporator means.

2. The air treating apparatus as recited in claim 1 wherein the rate of flow of the effluent is set to provide a minimal extra effluent draining from the bottom of said evaporator means.

3. An apparatus as recited in claim 1 wherein the water dispensing means comprises a tubular shaped member made of a porous type material which is expandable under water pressure and collapsible upon the removal of said water pressure.

4. An apparatus as recited in claim 3 wherein said water dispensing means has a predetermined water dispensing area which is less than the entire area of said water dispensing means.

5. In an air conditioning apparatus of the type having an efficiency which is reduced by the condensation of water droplets upon the cooling coils of the compressor, an apparatus for delivering a water cooled air stream to the air conditioning apparatus and for preventing water droplets from becoming a part of the air stream, the combination comprising:

effluent dispensing means for providing an effluent exuding at a controlled rate from said effluent dispensing means;

evaporator means having a plurality of interior surfaces, each of said interior surfaces operable to carry a portion of said effluent flow as well as to define a plurality of channels for conducting the air stream through said evaporator means; and said evaporator means being in contact with said effluent dispensing means for transferring the exuding effluent from the dispensing means to the evaporator means while preventing water droplets from being picked up by said air stream.

6. The air treating apparatus as recited in claim 5 wherein the rate of flow of the effluent is set to provide a minimal extra effluent draining from the bottom of said evaporator means.

7. An apparatus as recited in claim 5 wherein the water dispensing means comprises a tubular shaped member made of a porous type material which is expandable under water pressure and collapsible upon the removal of said water pressure.

8. An apparatus as recited in claim 7 wherein said water dispensing means has a predetermined water dispensing area which is less than the entire area of said water dispensing means.

9. The method of using Celdek material as an evaporator member in an air treatment apparatus for home air conditioning units with which it is important to eliminate water droplets from the air stream passing through the evaporator member, comprising the steps of:

using a Celdek structure approximately 3 inches thick in the direction of air flow as an evaporator member for cooling the air prior to passing over the air conditioning unit;

positioning a water dispensing means upon the upper surface of said evaporator member and substantially towards the air intake surface of said evaporator member;

providing a uniform effluent exuding from said water dispensing means and positioned in intimate contact with said upper surface of said evaporator means for eliminating water droplets from entering the air stream passing through said evaporator member whereby, said effluent wets the air intake surface of said evaporator member to a greater extent than the opposite surface of said evaporator member and said wet surfaces being employed for cooling the air stream passing therethrough, and said dryer surfaces of said evaporator member being employed for drying the air stream prior to the air stream exiting said evaporator member.

\* \* \* \* \*